US010585236B2

(12) United States Patent
Thomsen et al.

(10) Patent No.: US 10,585,236 B2
(45) Date of Patent: *Mar. 10, 2020

(54) SUPERCONTINUUM LIGHT SOURCE COMPRISING TAPERED MICROSTRUCTURED OPTICAL FIBER

(71) Applicant: NKT PHOTONICS A/S, Birkerod (DK)

(72) Inventors: Carsten L. Thomsen, Virum (DK); Thomas T. Alkeskjold, Jyllinge (DK); Erik B. Thomsen, Slangerup (DK)

(73) Assignee: NKT PHOTONICS A/S, Birkerod (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,908

(22) Filed: Apr. 2, 2018

(65) Prior Publication Data

US 2019/0049662 A1 Feb. 14, 2019

Related U.S. Application Data

(63) Continuation of application No. 15/362,531, filed on Nov. 28, 2016, now Pat. No. 9,958,606, which is a
(Continued)

(30) Foreign Application Priority Data

Jul. 10, 2013 (DK) .................................. 2013 70389

(51) Int. Cl.
*G02B 6/02* (2006.01)
*H01S 3/094* (2006.01)
(Continued)

(52) U.S. Cl.
CPC ..... *G02B 6/02376* (2013.01); *G01B 9/02007* (2013.01); *G01B 9/02091* (2013.01);
(Continued)

(58) Field of Classification Search
CPC ............ G02B 6/02376; G02B 6/02214; G02B 6/2333; G02B 6/02338; G02B 6/02347;
(Continued)

(56) References Cited

U.S. PATENT DOCUMENTS 6,654,522 B2 11/2003 Chandalia
6,796,699 B2 9/2004 Birk
(Continued)

FOREIGN PATENT DOCUMENTS

WO 01/86347 A1 11/2001
WO 2010060435 A1 6/2010
(Continued)

OTHER PUBLICATIONS

Cascante-Vindas, et al. "White light supercontinuum generation in a Yshaped microstructured tapered fiber pumped at 1064 nm" Jul. 5, 2010 / vol. 18, No. 14 / Optics Express 14535 (Year: 2010).*
(Continued)

*Primary Examiner* — Dominic J Bologna
(74) *Attorney, Agent, or Firm* — Buchanan Ingersoll & Rooney P.C.

(57) ABSTRACT

The invention relates to a supercontinuum light source comprising a microstructured optical fiber and a pump light source. The microstructured optical fiber comprises a core and a cladding region surrounding the core, as well as a first fiber length section, a second fiber length section and an intermediate fiber length section between said first and second fiber length sections. The first fiber length section comprises a core with a first characteristic core diameter. The second fiber length section comprises a core with a second characteristic core diameter, smaller than said first characteristic core diameter, where said second characteristic core diameter is substantially constant along said second fiber length section. The intermediate length section of the
(Continued)

optical fiber comprises a core which is tapered from said first characteristic core diameter to said second characteristic core diameter over a tapered length.

19 Claims, 9 Drawing Sheets

Related U.S. Application Data continuation of application No. 14/903,772, filed as application No. PCT/DK2014/050205 on Jul. 7, 2014, now Pat. No. 9,835,795.

(51) Int. Cl.

| | |
|---|---|
| H01S 3/0941 | (2006.01) |
| H01S 3/00 | (2006.01) |
| G02F 1/35 | (2006.01) |
| G02B 6/036 | (2006.01) |
| G02F 1/365 | (2006.01) |
| H01S 3/067 | (2006.01) |
| G01B 9/02 | (2006.01) |
| H01S 3/11 | (2006.01) |
| H01S 3/113 | (2006.01) |
| H01S 3/131 | (2006.01) |
| H01S 3/16 | (2006.01) |

(52) U.S. Cl.
CPC ..... *G02B 6/02214* (2013.01); *G02B 6/02333* (2013.01); *G02B 6/02338* (2013.01); *G02B 6/02347* (2013.01); *G02B 6/03633* (2013.01); *G02F 1/353* (2013.01); *G02F 1/365* (2013.01); *H01S 3/0092* (2013.01); *H01S 3/06725* (2013.01); *H01S 3/06741* (2013.01); *H01S 3/06745* (2013.01); *H01S 3/09415* (2013.01); *H01S 3/094076* (2013.01); *H01S 3/11* (2013.01); *G02F 2001/3528* (2013.01); *G02F 2202/32* (2013.01); *H01S 3/113* (2013.01); *H01S 3/1312* (2013.01); *H01S 3/1611* (2013.01)

(58) Field of Classification Search
CPC ............ G02B 6/03633; G01B 9/02007; G01B 9/02091; G02F 1/353; G02F 1/365; H01S 3/0092; H01S 3/06725; H01S 3/06741; H01S 3/06745; H01S 3/094076; H01S 3/09415; H01S 3/11
See application file for complete search history.

(56) References Cited

U.S. PATENT DOCUMENTS

| | | | |
|---|---|---|---|
| 7,403,688 B2 | 7/2008 | Knox | |
| 8,818,160 B2 | 8/2014 | Chavez-Pirson | |
| 8,977,087 B2 | 3/2015 | Jacobsen et al. | |
| 9,164,032 B2* | 10/2015 | Islam | G01J 3/453 |
| 2002/0006264 A1 | 1/2002 | Birk | |
| 2002/0114574 A1 | 8/2002 | Chandalia | |
| 2004/0114897 A1 | 6/2004 | Koshiba et al. | |
| 2005/0069269 A1* | 3/2005 | Libori | G02B 6/02042 |
| | | | 385/125 |
| 2006/0159398 A1 | 7/2006 | Knox | |
| 2006/0198588 A1 | 9/2006 | Kuksenkov et al. | |
| 2009/0207485 A1* | 8/2009 | Goto | G02B 6/02347 |
| | | | 359/341.3 |
| 2010/0303419 A1 | 12/2010 | Benjamin et al. | |
| 2011/0116282 A1 | 5/2011 | Okuno | |
| 2011/0194812 A1 | 8/2011 | Melin et al. | |
| 2012/0099340 A1* | 4/2012 | Buchter | G02F 1/365 |
| | | | 362/583 |
| 2012/0236314 A1 | 9/2012 | Fermann et al. | |
| 2013/0182999 A1 | 7/2013 | Jacobsen | |
| 2014/0185055 A1* | 7/2014 | Wang | A61B 5/0066 |
| | | | 356/479 |
| 2014/0204456 A1 | 7/2014 | Chavez-Pirson et al. | |
| 2016/0156148 A1 | 6/2016 | Thomsen et al. | |
| 2016/0170136 A1 | 6/2016 | Johansen | |

FOREIGN PATENT DOCUMENTS

| | | |
|---|---|---|
| WO | 2010138808 A1 | 12/2010 |
| WO | 2011160646 A1 | 12/2011 |
| WO | 2012/028152 A1 | 3/2012 |
| WO | 2012125391 A1 | 9/2012 |

OTHER PUBLICATIONS

Song et al., Analysis of the Scalability of Single-Mode Near-Infrared Supercontinuum to High Average Power, Journal of Optics, (2013) pp. 1-9, vol. 15, IOP Publishing Ltd. (Submitted in parent, U.S. Appl. No. 14/903,772).

Dudley et al., Supercontinuum Generation in Photonic Crystal Fiber, Reviews of Modern Physics, (Oct.-Dec. 2006) pp. 1135-1184, vol. 78, No. 4, The American Physical Society. (Submitted in parent, U.S. Appl. No. 14/903,772).

Chen et al., Picosecond Fiber MOPA Pumped Supercontinuum Source with 39 W Output Power, Optics Express 5426, (Mar. 15, 2010) pp. 1-7, vol. 18, No. 6, Optical Society of America. (Submitted in parent, U.S. Appl. No. 14/903,772).

Genty et al., Supercontinuum Generation in Large Mode-Area Microstructured Fibers, Optics Express 8625, (Oct. 17, 2005) pp. 1-9, vol. 13, No. 21, Optical Society of America. (Submitted in parent, U.S. Appl. No. 14/903,772).

Xiong et al., Enhanced Visible Continuum Generation from a Microchip 1064nm Laser, Optics Express 6188, (Jun. 26, 2006) pp. 1-6, vol. 14, No. 13, Optical Society of America. (Submitted in parent, U.S. Appl. No. 14/903,772).

Moller et al., Optimum PCF Tapers for Blue-Enhanced Supercontinuum Sources, Optical Fiber Technology, (2012) pp. 304-314, vol. 18, Elsevier Inc. (Submitted in parent, U.S. Appl. No. 14/903,772).

Moller et al., Optimization of Tapered Photonic Crystal Fibers for Blue-Enhanced Supecontinuum Generation, Proceedings of Nonlinear Photonics (2012) pp. 1-3, Optical Society of America. (Submitted in parent, U.S. Appl. No. 14/903,772).

Notification of Transmittal of the International Search Report and the Written Opinion of the International Searching Authority (Forms PCTIISAf220 and PCT/ISAf237) dated Oct. 14, 2014, by the Danish Patent Office in corresponding International Patent Application No. PCT/01<2014/050205. (Submitted in parent, U.S. Appl. No. 14/903,772).

Search Report dated Feb. 19, 2014, by the Danish Patent and Trademark Office in corresponding Danish Patent Application No. PA 2013 70389. (4 pages) (Submitted in parent, U.S. Appl. No. 14/903,772).

Examination Report dated Feb. 19, 2014, by the Danish Patent and Trademark Office in corresponding Danish Patent Application No. PA 2013 70389. (3 pages) (Submitted in parent, U.S. Appl. No. 14/903,772).

J. Cascante-Vindas et al. White light supercontinuum generation in a Y-shaped microstructured tapered fiber pumped at 1064 nm. Optics Express, 18:14:14535-14540, Jul. 2010. (As cited by examiner in parent case, U.S. Appl. No. 14/903,772).

A. Marandi et al. Mid-infrared supercontinuum generation in tapered chalcogenide fiber for producing octave-spanning frequency comb around 3 μm. Optics Express, 20:22:24218-24225, Oct. 2012. (As cited by examiner in parent case, U.S. Appl. No. 14/903,772).

M. Liao et al. Five-order SRSs and supercontinuum generation from a tapered tellurite microstructured fiber with longitudinally varying dispersion. Optics Express, 19:16:15389-15396, Aug. 2011. (As cited by examiner in parent case, U.S. Appl. No. 14/903,772).

(56) References Cited

OTHER PUBLICATIONS

International Search Report (PCT/ISA/210) dated Oct. 14, 2014, by the Danish Patent Office as the International Searching Authority for International Application No. Jul. 7, 2014. (Submitted in parent, U.S. Appl. No. 14/903,772).

Written Opinion (PCT/ISA/237) dated Oct. 14, 2014, by the Danish Patent Office as the International Searching Authority for International Application No. Jul. 7, 2014. (Submitted in parent, U.S. Appl. No. 14/903,772).

J.C. Travers et al., "Extended blue supercontinuum generation in cascaded holey fibers", Opt. Lett. 30, 3-32-3134 (2005) (Submitted in parent, U.S. Appl. No. 14/903,772).

A. Kudlinski et al., "Zero-dispersion wavelength decreasing photonic crystal fibers for ultraviolet-extended supercontinuum generation", Optics Express 14, 5715 (2006) (Submitted in parent, U.S. Appl. No. 14/903,772).

S. Sørensen et al., "Deep-blue supercontinuum light sources based on tapered photonic crystal fibres", Kgs. Lyngby: Technical University of Denmark. 2013. (http://orbit.dtu.dk/en/publications/deepblue-supercontinuum-light-sources-based-on-tapered-photonic-crystal-bres(f173ac8e-fa47-4330-93a4-d9997e1b1916)/export.html) (Submitted in parent, U.S. Appl. No. 14/903,772).

Supplementary European Search Report dated Feb. 27, 2017, by the European Patent Office in corresponding European Patent Application No. 14 82 2529. (2 pages).

Falk et al., "Supercontinuum Generation in a Photonic Crystal Fiber Tapered to Normal Dispersion for all Wavelengths," 17th International Conference on Optical Fibre Sensors, Proceedings of SPIE, (2005), vol. 5855, pp. 318-321.

Kudlinski et al., "Control of Pulse-to-Pulse Fluctuations in Visible Supercontinuum," Optics Express, (Dec. 20, 2010), vil. 18, No. 26, pp. 27445-27454.

Lu et al., "Low noise Wavelength Conversion of Femtosecond Pulse with Dispersion Micro-Managed Holey Fibers," Optics Express, (Oct. 3, 2005), vol. 13, No. 20, pp. 8172-8178.

Travers, "Blue Extension of Optical Fibre Supercontinuum Generation," Journal of Optics, (2010), vol. 12, 113001, No. 11. pp. 1-19.

Danish Search Report and Examination Report dated Feb. 21, 2014, by the Danish Patent and Trademark Office in Danish Patent Application No. PA 2013 70390. (6 pages).

The extended European Search Report dated Jan. 25, 2017, by the European Patent Office in European Application No. 14823553.4-1871. (9 pages).

International Search Report (Form PCT/ISA/210) and the Written Opinion of the International Search Authority (Form PCT/ISA/237) dated Nov. 7, 2014, by the Danish Patent Office as the International Searching Authority for International Application No. PCT/DK2014/050206. (9 pages).

The extended European Search Report dated Mar. 8, 2017, by the European Patent Office in corresponding European Patent Application No. 14822529.5-1556. (8 pages).

European Communication Pursuant to 94(3) dated Apr. 2, 2019, by the European Patent Office in corresponding European Patent Application No. 14822529.5-1556. (10 pages).

\* cited by examiner

SUPERCONTINUUM LIGHT SOURCE COMPRISING TAPERED MICROSTRUCTURED OPTICAL FIBER

TECHNICAL FIELD

The invention relates to a microstructured optical fiber suitable for generating supercontinuum light and the production of such an optical fiber using for instance a drawing tower. Tapering of an optical fiber is advantageous in several systems, such as in a system for supercontinuum generation, where the tapering of e.g. a non-linear fiber according to an embodiment of the present invention results in significant improvements over the prior art systems.

BACKGROUND OF THE INVENTION

In optical fibers, a supercontinuum light is formed when a collection of nonlinear processes act together upon feeding of a pump beam in order to cause spectral broadening of the original pump beam. The result may be a smooth spectral continuum spreading such as over more than an octave of wavelengths. Suitable non-linear processes are for example self-phase and cross-phase modulation, four-wave mixing, Raman gain or soliton based dynamics, interacting together to generate the supercontinuum light. In order to get the broadest continua in an optical fiber, it is most efficient to pump in the anomalous dispersion regime; however a spectral continuum may in some situations be obtained by pumping in the normal dispersion regime. Microstructured optical fibers are suitable for supercontinuum generation due to their high non-linearity and their customizable zero dispersion wavelength.

The term "microstructured fibers" in this context is meant to cover fibers comprising microstructures such as photonic crystal fibers, photonic bandgap fibers, leaky channel fibers, holey fibers, etc. Unless otherwise noted, the refractive index refers to the average refractive index which is usually calculated separately for the core and each cladding layer surrounding it, whether the fiber is a standard fiber, where the core and any cladding layers surrounding that core have a substantially homogeneous refractive index, or a microstructured fiber where the core and/or one or more cladding layers comprise microstructures. A cladding layer is defined a layer with a thickness and surrounding the core where the refractive index is substantially homogeneous or where the where the layer has a base material with substantially homogeneous refractive index and a plurality of microstructures arranged in a uniform pattern.

A problem in relation to the present optical fibers for supercontinuum generation is that high optical peak power and/or pulse energies over time damage(s) the optical fibers. The article "Analysis of the scalability of single-mode near-infrared supercontinuum to high average power" by Rui Song et al, published 29 Jan. 2013 in IOP Publishing, Journal of Optics, J. Opt. 15 (2013) 035203 examines the restrictions imposed by thermal and nonlinear effects, fiber end facet damage, pump and fiber combiner limits, and damage to the amplifier fibers. In terms of nonlinear effects, the restriction is the self-focus effect, whose threshold is around 4 MW. The fiber end facet damage threshold limits the power density to 10 W $\mu m^{-2}$, but the damage threshold can be improved by using an end-cap with a large diameter. Here the end-cap consists of pure fused silica. By expanding the fiber mode in the end-cap, the power density on the surface can be reduced to under the average output power, so that the surface damage threshold is increased.

Supercontinuum generation is a complex process, and any quantitative explanation of the underlying physics must take into account a number of different fiber and pulse parameters. Nonetheless, it is generally accepted that the most efficient method to obtain a very broad supercontinuum is by using a pump wavelength slightly in the anomalous group-velocity dispersion (GVD) regime of a highly nonlinear Photonic Crystal Fiber (PCF) with only one zero-dispersion wavelength (ZDW) below the absorption limit of the material. In contrast pumping in the normal GVD regime of a PCF will in general reduce the bandwidth and require a longer length of the PCF (J. Dudley et al, "Supercontinuum generation in photonic crystal fiber", Reviews of Modern Physics, Vol. 78, p. 1135, October-December 2006).

Normally high power supercontinuum sources use a pump wavelength of around 1064 nm and a PCF with a core size of about 3.5 to 5 µm. A standard calculation of the dispersion shows that the core size of a PCF having ZDW of 1064 nm increases with the hole size, and for very large hole sizes it reaches about 6 µm. Hence in order to have anomalous dispersion at 1064 nm in a PCF the core size is limited to around 6 µm or less.

E.g. K. K. Chen report a "Picosecond fiber MOPA pumped supercontinuum source with 39 W output power" (Optics Express, Vol. 18, No. 6, p. 5431, 15 Mar. 2010). They used a 21 ps 1060 nm laser which is pumped into a 2 m long PCF with a core size of 4.4 µm and a ZDW of 1012 nm and found that the maximum average power was limited by thermal damage. Hence they concluded that power scaling might therefore be possible by using a mode-expanding end-cap at the input to the fiber.

G. Genty et al report normal pumped supercontinuum in PCFs with cores up to 20 µm in the paper "Supercontinuum generation in large mode-area microstructured fibers" (Optics Express, Vol. 13, No. 21, p. 8625, 17 Oct. 2005). Here it is shown that a supercontinuum spanning more than an octave can be generated by a 3 ns 1064 nm pump in a 100 m long fiber with a 10 µm core, and the mechanisms leading to the continuum in this case primarily rely on the processes of cascaded stimulated Raman scattering and four-wave mixing. It is concluded that the large area of the fibers should allow for the generation of extremely high power supercontinuum as the damage threshold is considerably increased. However, it is observed that the normalized intensity is significantly higher above than below the pump wavelength of 1060 nm, and that a further increase of the core size leads to a significant decrease of the power on the blue side of the spectrum.

C. Xiong et al have reported another example of normal pumped supercontinuum in "Enhanced visible continuum generation from a microchip 1064 nm laser" (Optics Express, Vol. 14, No. 13, p. 6188, 26 Jun. 2006). Here a tapered fiber approach was used, the first fiber section has a core size of 5 µm and a ZDW of 1103 nm. The proximity of the ZDW to pump wavelength allows for a strong four-wave mixing gain to 742 nm, allowing >35% conversion of the 1064 nm pump light over a 3 m long fibre. The fiber is tapered to a core size of 1.7 µm giving a ZDW of 700 nm, as previous studies have shown that small-core PCF are ideal for super continuum generation from pulsed sources at wavelengths from 600 to 800. This fiber gives a bright single mode visible light source with output power of up to 20 dB/m.

SUMMARY OF THE INVENTION

It is an object of the present invention to provide an optical fiber for generating supercontinuum light, with a relatively low risk of fiber damage even where the fiber is arranged to provide high pulse energy.

In an embodiment it is an object to provide an optical fiber for generating supercontinuum light with an increased output power compared with present optical fibers.

It is another object of the invention to provide a supercontinuum light source that is able to output supercontinuum light with high output power while simultaneously having a relatively low risk of fiber damage.

In an embodiment it is an object to provide a supercontinuum light source with an increased output power compared to present supercontinuum light sources. The supercontinuum light source of the invention is advantageously suitable for use in an optical measurement system. In an embodiment of the present invention a microstructured optical fiber for generating supercontinuum light upon feeding of light having a first wavelength $\lambda_1$ is provided. The optical fiber has a length and a longitudinal axis along its length and comprises a core region for guiding light along the length of the optical fiber, and a first cladding region surrounding the core region. Along its length, the optical fiber comprises a first fiber length section, a second fiber length section as well as an intermediate fiber length section between the first and second fiber length sections. The first fiber length section has a core region with a first characteristic core diameter $W_1$ in a cross-section through the fiber perpendicularly to the longitudinal axis, wherein the first characteristic core diameter is larger than about 7 μm. The second fiber length section has a core region with a second characteristic core diameter $W_2$ in a cross-section through the fiber perpendicularly to the longitudinal axis, where the second characteristic core diameter $W_2$ is smaller than the first characteristic core diameter $W_1$. The intermediate fiber length section of the optical fiber comprises a core region which is tapered from the first characteristic core diameter $W_1$ to the second characteristic core diameter $W_2$ over a tapered length $L_t$. The first fiber length section has normal dispersion at the first wavelength $\lambda_1$ and the second fiber length section has zero dispersion at a second wavelength $ZDW_2$, where $ZDW_2$ is up to about $\lambda_1$+50 nm. The second fiber length section has anomalous dispersion at wavelengths above the second wavelength $ZDW_2$.

The microstructured optical fiber has shown to have a very high resistance against fiber damage even where the fiber is arranged to provide high pulse energy, and it has been found that a very broad high power supercontinuum may be generated. Due to the relatively large first characteristic core diameter of the first fiber length section, large amount of light may be fed to the fiber while the relatively smaller second characteristic core diameter of the second fiber length section ensures that a very broad supercontinuum may be generated even with high power on the blue side of the spectrum.

In order to provide a desired broad supercontinuum it is preferred that the first wavelength $\lambda_1$ is about 1100 nm or less. More preferably the first wavelength $\lambda_1$ is from about 700 nm to about 1100 nm, such as from about 900 nm to about 1100 nm. The characteristic core diameter is a term applied in the context of the present specification as a generalization that enables determination of the diameter of the core even if the core of the fiber is not circular. Another definition of the characteristic diameter of the core of a fiber is the outer diameter of a refractive index profile which provides guiding when light is launched in the center of the fiber (assuming cylinder symmetry).

The core is normally located along the centre axis of the fiber and is usually surrounded by one or more cladding regions. Other shapes of cores are also possible, such as elliptical cores, and a fiber may comprise more than one core. The cladding region(s) is/are often further surrounded by one or more coating(s) and/or other layer(s) often suitable for providing environmental and/or mechanical shielding.

Light is normally guided in the core by refraction and/or total internal reflection due to a higher refractive index in the core relative to the cladding. The average refractive index of the core and/or cladding(s) may be engineered by doping the base material and/or by introducing microstructures running along the length of the fiber.

In a microstructured optical fiber, the core area is usually defined as the area of a circle inscribed by the elements of the fiber arranged to immediately surround the core. In the context of the present invention, the phrase "characteristic core diameter" of a microstructured optical fiber refers to the diameter of the largest circle that may be inscribed within the core without interfering with any such elements of the fiber, in a cross-section through the fiber perpendicularly to the longitudinal axis thereof.

The microstructured optical fiber or simply called the optical fiber comprises at least one tapered length and is therefore also referred to as a tapered microstructured optical fiber. However, it should be understood that the phrase "tapered microstructured optical fiber" does not mean that the microstructured optical fiber is tapered along its whole length but merely that it comprises at least one tapered length $L_1$.

The phrase "normal dispersion" is well-known to the skilled person and denotes that the dispersion D satisfies: D<0 ps/nm/km. The term "zero dispersion wavelength" denotes a wavelength where the group delay dispersion, i.e. the second-order dispersion, of the light is zero. It is also well-known to the skilled person that when the dispersion is anomalous, the rate of change of the index of refraction with respect to the wavelength changes sign compared to the normal dispersion range, and the group velocity of light is no longer an indicator of signal velocity.

The first fiber length section of the microstructured optical fiber is preferably arranged to facilitate a substantial unchanged spectral distribution of light passing through the core of the first fiber length section of the optical fiber.

In an embodiment the microstructured optical fiber is fed with light at one or more further wavelengths, such as at wavelengths close to half the first wavelength $\lambda_1$.

The intermediate fiber length section of the microstructured optical fiber has a core region with a non-constant characteristic core diameter at least along part of the intermediate fiber length section, and the microstructure of the optical fiber exists at least along a part of the length of the intermediate fiber length section of the optical fiber.

The phrases "first fiber length section" and "second fiber length section" are not intended to limit the scope of the claims to situations where light propagates from the first fiber length section towards the second longitudinal position. The tapered microstructured optical fiber also relates to embodiments, wherein light propagates from the second fiber length section towards the first fiber length section.

In an embodiment the tapered microstructured optical fiber is configured for propagating light from the first fiber length section towards the second fiber length section In the context of the present invention, the phrase "supercontinuum" refers to a spectrally broad signal. The supercontinuum is said to have a "blue edge" defining the lower boundary of the spectrum and a "red edge" defining the upper boundary of the spectrum. In a silica optical fiber, the blue edge may advantageously be at a wavelength in the range of 300 nm to 600 nm, and the red edge may advantageously be at a wavelength in the range of 1300 nm to 2400 nm, such as in the range of 1600 nm to 2400 nm. The spectral width of the supercontinuum is defined as the difference between the wavelength of the red and blue edges.

In an embodiment, the second fiber length section of the optical fiber has a zero dispersion wavelength in the range from about $\lambda_1$−150 nm to about $\lambda_1$+50 nm. Fibers having such zero dispersion wavelengths relatively close to the pumping wavelength have been found to be very well suited for broad supercontinuum generation.

In an embodiment, the tapered length $L_i$ is at least about 0.5 m, such as larger than about 1 m, such as larger than about 1.5 m, such as larger than about 2 m, such as larger than about 3 m, such as larger than about 5 m. Thereby, the tapering is advantageously carried out in a drawing tower during the generation of the optical fiber as opposed to in a tapering station. By having a relatively long tapered length $L_i$ it has been found that even higher output power is obtainable without resulting in damage of the microstructured optical fiber.

In an embodiment, the first fiber length section has zero dispersion at a wavelength $ZDW_1$ where $ZDW_1$>about $\lambda_1$+20 nm, preferably $ZDW_1$>about $\lambda_1$+40 nm, preferably $ZDW_1$>about $\lambda_1$+60 nm, preferably $ZDW_1$>about $\lambda_1$+80 nm, preferably $ZDW_1$>about $\lambda_1$+100 nm. Hereby, the first fiber length section of the microstructured optical fiber is arranged to facilitate a substantially unchanged spectral distribution of light passing through it. Thereby the supercontinuum generation will take place mainly in the second fiber length section and optionally partly in the intermediate fiber length section.

In an embodiment the first characteristic core diameter is larger than about 1.5 times the second characteristic core diameter, such as larger than about 2 times the second characteristic core diameter, such as larger than about 3 times the second characteristic core diameter, such as larger than about 4 times the second characteristic core diameter, such as larger than about 5 times the second characteristic core diameter.

In an embodiment the first characteristic core diameter is larger than about 8 µm, such as larger than about 10 µm, such as larger than about 15 µm, such as larger than about 20 µm, such as larger than about 25 µm.

In an embodiment the second characteristic core diameter is larger than about 3 µm, such as larger than about 3.5 µm, such as larger than about 4 µm, such as larger than about 4.5 µm, such as larger than about 5 µm, such as larger than about 5.5 µm.

The invention provides a new concept where the first fiber length section may be designed for optimal light feeding at a high pulse energy and the second fiber length section may be designed for optimal supercontinuum generation and further the intermediate fiber length section may designed for optimal connecting of the first and the second fiber length section e.g. to provide substantially adiabatic transfer of light along the core of the intermediate fiber length section. Based on the teaching of the present invention the skilled person will be able to optimize the individual sections to thereby obtain a microstructured fiber of the invention with high damage threshold and with optimal properties for a specific application.

In an embodiment the inner cladding comprises a microstructure, where the microstructure comprises a plurality of microstructure elements having a microstructure element diameter, $d_f$. The microstructure elements are arranged at a pitch $\wedge$, where the pitch $\wedge$ is a measure of a spacing between the microstructure elements. Advantageously the microstructure is at least partially maintained along both the first and second fiber length sections of the optical fiber. The microstructure element diameter, $d_f$, the pitch $\wedge$ of the microstructure elements as well as the characteristic diameter W of the core are illustrated in FIGS. 2 and 3 and will be described in more details below. In the context of the present invention, the phrase "microstructure is partially maintained" means that the microstructure is present in some of or all of the first fiber length section as well as being present in some of or all of the second fiber length section. As an example, the microstructure might be collapsed at an end of the first and/or second fiber length section, providing an end cap, whilst it is present throughout the rest of the first and second fiber length sections.

In an embodiment, the relative size ($d_f/\wedge$) of the microstructure elements is substantially equal in the first and second fiber length sections of the optical fiber, where the relative size is the ratio between the diameter of the microstructure elements $d_f$ and the pitch $\wedge$. As an example, the microstructure elements are holes or elements having a lower refractive index than the base material of the optical fiber.

The term "substantially" as used herein means to include what is within the ordinary tolerances.

In an embodiment the relative size $d_f/\wedge$ of the microstructure elements is larger in the second fiber length section of the optical fiber than in the first fiber length section of the optical fiber, the relative size being the ratio between the diameter $d_f$ of the microstructure elements and the pitch $\wedge$. In this embodiment, the relative size of the microstructure elements preferably varies throughout at least a part of the intermediate fiber length section of the optical fiber. Thus, the size of the microstructure elements is for example changed as the core size is changed. It is advantageous that the relative size $d_f/\wedge$ of the microstructure elements is larger in the second fiber length section than in the first fiber length section, in that relative large $d_f/\wedge$ may assist in avoiding multimode light at large core sizes of the first fiber length section. In an embodiment, the change in relative size $d_f/\wedge$ of the microstructure elements is provided by pressure control during drawing of the optical fiber in a drawing tower. A control of the relative size $d_f/\wedge$ of the microstructure elements is for example as described in patent application EP1153325.

In an embodiment the relative size of the microstructure elements is chosen so that the first fiber length section is a single mode fiber at least at the first wavelength $\lambda_1$.

According to an embodiment, the optical fiber comprises an end cap adjacent to the first fiber length section. The end cap is advantageously adjacent to a first end of the first fiber length section opposite a second end of the first fiber length section adjacent to the intermediate fiber length section of the microstructured optical fiber. The term "end cap" is meant to denote a fiber end part without microstructures and providing an input to or an output from the optical fiber. Thus, the term "end cap" covers both a piece of glass material added to a microstructured fiber as well as an end part of the microstructured optical fiber itself, where no microstructures exist due to e.g. collapsing of the microstructures.

The end cap may advantageously have a uniform refractive index. In an embodiment the end cap has a length of up to 100 times the first characteristic core diameter.

In an embodiment, the optical fiber comprises an end cap at the input end of the microstructured optical fiber thereby providing an even higher damage threshold and simultaneously providing a fiber end suitable for splicing.

In an embodiment, the optical fiber comprises an end cap at the output end of the microstructured optical fiber e.g. to provide a fiber end suitable for splicing.

In an embodiment, the microstructured optical fiber comprises a third fiber length section with a third characteristic core diameter $W_3$ and a second intermediate fiber length section between the second fiber length section and the third fiber length section, where the second intermediate fiber length section comprises a core region which is tapered from the second characteristic core diameter $W_2$ to the third characteristic core diameter $W_3$, where $W_3$ is larger than $W_2$. In one embodiment, $W_3$ is substantially equal to $W_1$. In an embodiment, the optical fiber further comprises a multi-cladding-structure provided by a second cladding surrounding the first cladding, where the core region is adapted to guide an optical signal at the first wavelength $\lambda_1$. The core region has an effective refractive index $n_{core}$, and the core region comprises a material doped with at least one rare earth element. The first cladding is arranged for guiding light at a third wavelength $\lambda_3$. The first cladding preferable has an effective refractive index $n_{first-clad}$, and the second cladding has an effective refractive index $n_{second-clad}$, wherein $n_{core}>n_{first-clad}>n_{second-clad}$ and $\lambda_1>\lambda_3$. In an embodiment the multi-cladding structure features of the optical fiber are present in the first, second and intermediate fiber length section of the microstructured optical fiber. In an embodiment where the optical fiber comprises a second intermediate fiber length section and a third fiber length section, the multi-cladding structure is also present in these fiber length sections. Thus, in this embodiment the first, second and intermediate fiber length sections of the microstructured optical fiber, as well as the second intermediate fiber length section and the third fiber length section, if present in the optical fiber, all contain rare earth elements. The core region of this optical fiber in this embodiment is thus a cladding pumped amplifier waveguide for amplifying an optical signal at a wavelength $\lambda_1$. In this embodiment, the first cladding is an inner cladding, whilst the second cladding is an outer cladding surrounding the first cladding, wherein the inner cladding is adapted to guiding pump light whilst the outer cladding is adapted to keeping pump light inside the outer cladding. In an embodiment, $\lambda_3$ is within the absorption band of the rare earth element, e.g. the absorption band of Ytterbium. By this embodiment an even higher power supercontinuum may be generated.

In an embodiment, the microstructuring of the microstructured optical fiber comprises microstructure elements of a microstructure material embedded in a base material, wherein the refractive index of the core, $n_{core}$, is equal to the refractive index of the base material. In an embodiment, the refractive index of the core, $n_{core}$ is substantially equal to the refractive index of silica glass.

In an embodiment, the at least one rare earth element is Ytterbium (Yb) and/or Neodymium (Nd).

As mentioned above, the invention also relates to a supercontinuum light source comprising a microstructured optical fiber for generating supercontinuum light at a wavelength $\lambda$. The microstructured optical fiber comprises a core region that is capable of guiding light along a longitudinal axis of the optical fiber, and a first cladding region surrounding the core region. The microstructured optical fiber further comprises a pump light source arranged to feed light into the core region at an input end of the optical fiber, where the light has a first wavelength, $\lambda_1$. The optical fiber has a length and a longitudinal axis along its length, wherein the optical fiber comprises a first fiber length section, a second fiber length section as well as an intermediate fiber length section between the first and second fiber length sections. The first fiber length section has a core region with a first characteristic core diameter $W_1$, wherein the first characteristic core diameter is larger than about 7 µm; the second fiber length section has a core region with a second characteristic core diameter $W_2$ in a cross-section through the microstructured optical fiber perpendicularly to the longitudinal axis, where the second characteristic core diameter $W_2$ is smaller than the first characteristic core diameter $W_1$. The intermediate fiber length section of the optical fiber comprises a core region which is tapered from the first characteristic core diameter $W_1$ to the second characteristic core diameter $W_2$ over a tapered length $L_t$.

The first fiber length section preferably has normal dispersion at a first wavelength $\lambda_1$ up to about 1100 nm, more preferably from about 900 nm to about 1100 nm and the second fiber length section has zero dispersion at a second wavelength $ZDW_2$, where $ZDW_2$ is smaller than up to about $\lambda_1+50$ nm, and the second fiber length section has anomalous dispersion at wavelengths above the second wavelength $ZDW_2$.

Advantageously the optical fiber of the SC light source is as described in one or more of the above embodiments.

In an embodiment the pulse duration $\Delta t$ of the pump light source is more than about 1 ps, such as more than about 5 ps, such as more than about 10 ps, such as more than about 50 ps, such as more than about 100 ps, such as more than about 500 ps, such as more than about 1 ns, such as more than about 2 ns, such as more than about 5 ns, such as more than about 10 ns, such as more than about 50 ns, such as more than about 1 ms. The output pulse length is controllable by controlling the pump characteristics, i.e. the pump pulse length.

In an embodiment the pulse duration $\Delta t$ of the pump light source is less than about 1 ms, such as less than about 50 ns, such as less than about 10 ns, such as less than about 5 ns, such as less than about 2 ns, such as less than about 1 ns, such as less than about 500 ps, such as less than about 100 ps, such as less than about 50 ps, such as less than about 10 ps, such as less than about 5 ps, such as less than about 1 ps.

In an embodiment the pulse duration $\Delta t$ of the pump light source is more than about 1 ps, such as more than about 5 ps, such as more than about 50 ps such as more than about 100 ps, such as more than about 500 ps, such as more than about 1 ns, such as more than about 2 ns, such as more than about 5 ns. Relative long pulses are in particular suitable for use in photoacoustic applications where high energy pump pulses normally are desirable.

It is well-known to the skilled person that the output pulse length of a supercontinuum light source is controllable by controlling the characteristics of the light fed into the optical fiber, i.e. by controlling the pump pulse characteristics.

In an embodiment, the output pulse from the supercontinuum light source has a pulse length of less than about 20 ns and an output spectral density over at least 50 nm between 400 nm and 900 nm such as at least 100 nJ/10 nm, such as at least 200 nJ/10 nm, such as at least 300 nJ/10 nm, such as at least 500 nJ/10 nm, such as at least 1000 nJ/10 nm. Hereby, the supercontinuum light source is suitable for photoacoustic applications.

In an embodiment the pump light source comprises a mode-locked laser and at least one amplifier, and the supercontinuum light source has an output spliced onto the input end of the optical fiber. In this embodiment, the connection feeding light from the pump light source to the optical fiber does not comprise any free space couplings. In this embodiment, the number of splicings and/or intermediate fibers is reduced, which makes it possible to produce the optical fiber faster compared to an optical fiber with more splicings. Further, any risk of power loss due to splicings is reduced due to a reduced number of splicings. This embodiment is in particular suitable for systems with picosecond pulses having one or more amplifier.

In an embodiment, the supercontinuum light source is used for at least one of the following applications: photoacoustic measurements, multi-spectral imaging, LIDAR (Light Detection and Ranging), STED (Stimulated Emission Depletion).

The inventors further disclose a pump light source comprising a system for active feedback.

The pump light source may advantageously be used as a part of the supercontinuum light source of the invention but it may in principle be applied as a light source in any optical systems such as in a supercontinuum light source based on any SC generating optical fiber, such as any prior art non-linear optical fiber suitable for supercontinuum generation.

The pump light source comprises a laser diode arranged to feed light to a pump laser such as a q-switched laser. The pump light source further comprises a photodiode and a control unit. The photodiode is arranged to receive part of an emitted pulse, preferably incident light, from the pump diode. The light received is preferably a minor amount of the emitted pulse, such that the power of the pump laser is not substantially reduced thereby. The photodiode is arranged to transmit a signal to the control unit upon receipt of part of the emitted pulses from the pump laser and the control unit is arranged to shut of the laser diode e.g. via transmission of a signal upon receipt of the signal from the pump laser.

The signal from the photodiode is sent to a control unit 33, which sends a signal to the laser diode to shut it "OFF" thus preventing further light to be pumped into the laser cavity.

The pump light source with the system for active feedback adds to improved control of the emission frequency (repetition rate) of the pump laser, and/or to reduce the timing jitter between the pump laser pulses.

In one embodiment the control is obtained by modulating the output from the laser diode in dependence on the photodiodes detection of whenever a pulse is emitted from the pump laser. The feedback signal is used to switch the laser diode from "ON" (emitting light) to "OFF" (no emission).

The photodiode should advantageously be positioned such that it receives part of the emitted pulses from the pump laser (e.g. 1064 nm), but such that it is substantially not sensitive to light emitted from the laser diode (e.g. 808 nm) as light from the laser diode may give rise to noise in the detection. This may be obtained by either careful selection of photodiode type or by placing an appropriate filter in front of the detector.

BRIEF DESCRIPTION OF DRAWINGS

The invention will be explained in more detail below in connection with preferred embodiments and with reference to the drawings in which.

The figures are schematic and are simplified for clarity. Throughout, the same reference numerals are used for identical or corresponding parts.

Figure 1:
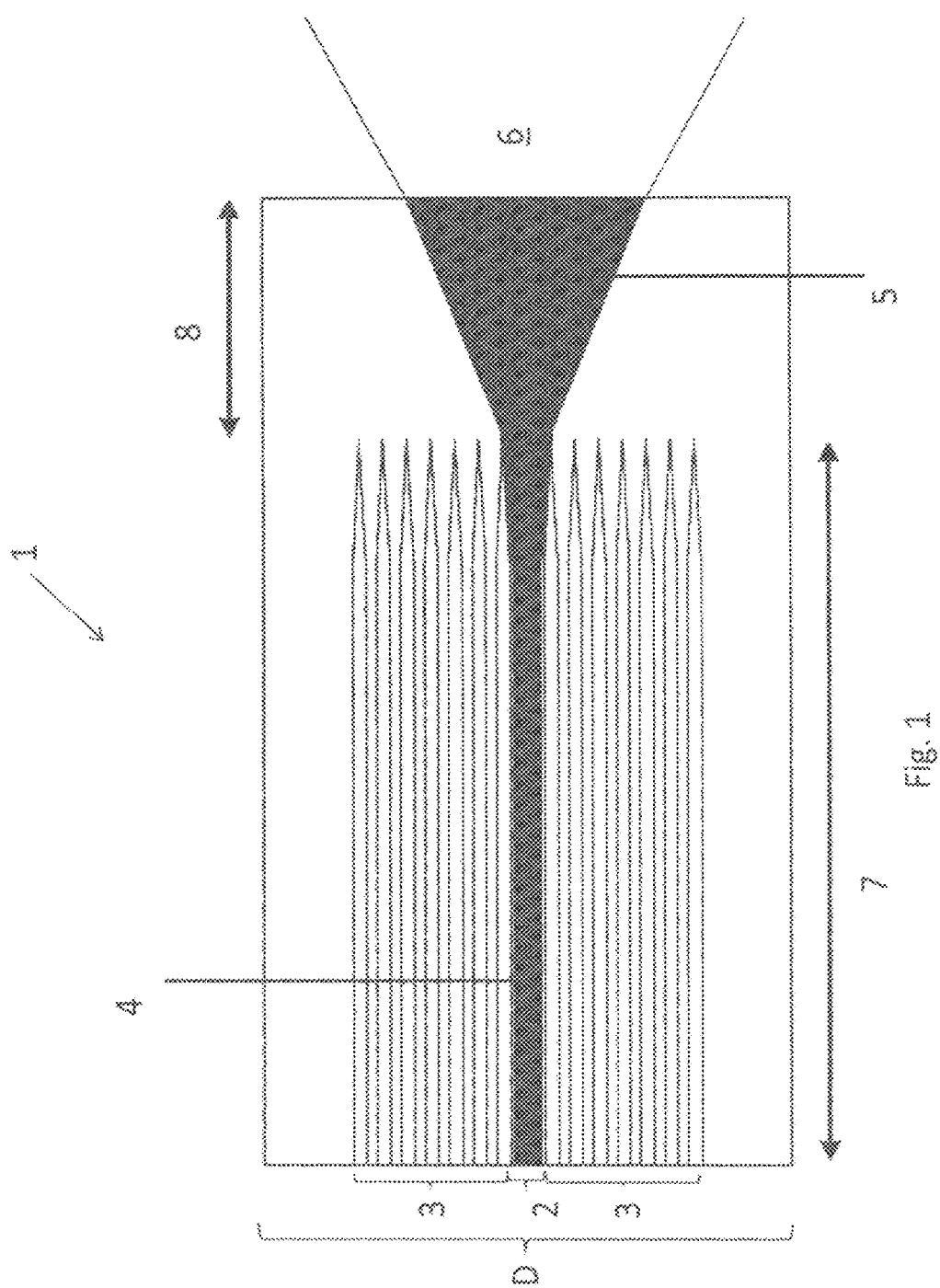
FIG. 1 is a schematic drawing of a cross-section of a microstructured fiber, along the longitudinal axis.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been described in the foregoing, but it should be stressed that the invention is not limited to these, but may be embodied in other ways within the subject-matter defined in the following claims.

With reference to FIG. 1 is described a schematic drawing of a cross-section of a microstructured fiber, along the longitudinal axis. The cross-section is an enlarged view of a very short length of microstructured fiber 1. The microstructured fiber 1 has a core region 2 and a cladding region 3 surrounding the core region 2.

The microstructured optical fiber 1 has a length consisting of a length 7 of the microstructured fiber as well as a length 8 of an end cap, as well as an outer diameter D. The microstructures of the microstructured fiber 1 are holes. These holes have been collapsed as shown in the figure in the area of fiber length 7 adjacent to the end cap 8. One way of carrying out such a collapse is by heating of the optical fiber 1.

In this prior art embodiment, the microstructured fiber is a non-tapered fiber. The characteristic diameter of the core is of the order of magnitude "some μm", typically 3.5 or 5 μm; the extension of the end cap length 8 in the longitudinal axis of the fiber is of a magnitude of 100 μm, e.g. 200 μm, whilst the microstructured fiber length is e.g. several meters, for example 10 meters.

Light has been fed into the fiber; the reference number 4 indicates light confined within the core region of the fiber 1, reference number 5 indicates light spreading from the core region of the length 7 of the fiber into the end cap 8, whilst reference number 6 indicates light exiting from the end cap 8 of the optical fiber 1. It may be seen that the light spreads out in the region of the collapsed microstructures and in the end cap 8 compared to the length 7.

Figure 2:
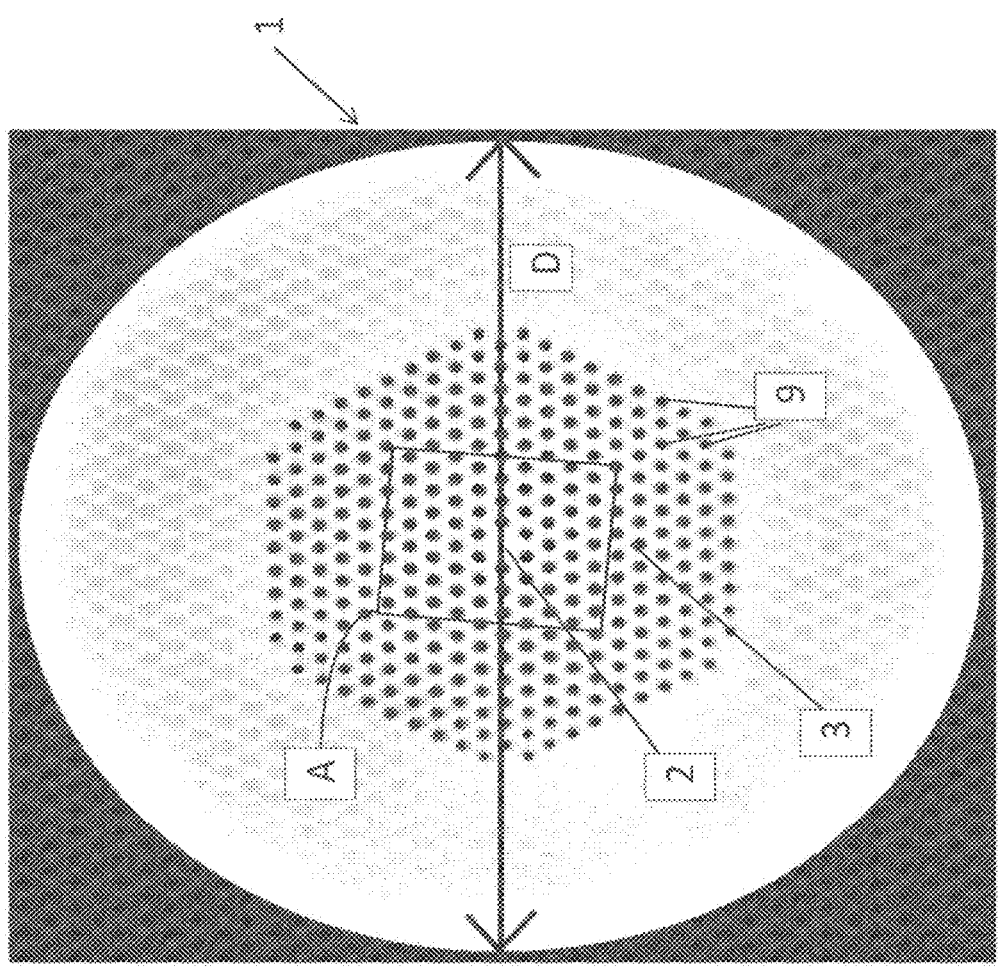
FIG. 2 shows a picture of a cross-section of a microstructured fiber, perpendicular to the longitudinal axis.

FIG. 2 shows a picture of a cross-section of a microstructured fiber 1, perpendicular to the longitudinal axis. The fiber is a microstructured fiber comprising a core region 2 and a cladding region 3, the cladding region surrounding the core region. The cladding region comprises low-index cladding features 9, here including features in the form of holes or voids extending in the longitudinal direction of the fiber, and an inner cladding background or base material. The core region 2 comprises a refractive index profile such that the core region comprises material with a refractive index $n_{core}$ being different from the refractive index of a material in the inner cladding region. In order to tune various properties of the optical fiber it may be preferred to have a special refractive index profile of the core region. The region A denotes an area of the fiber to be shown enlarged in FIG. 3.

Figure 3:
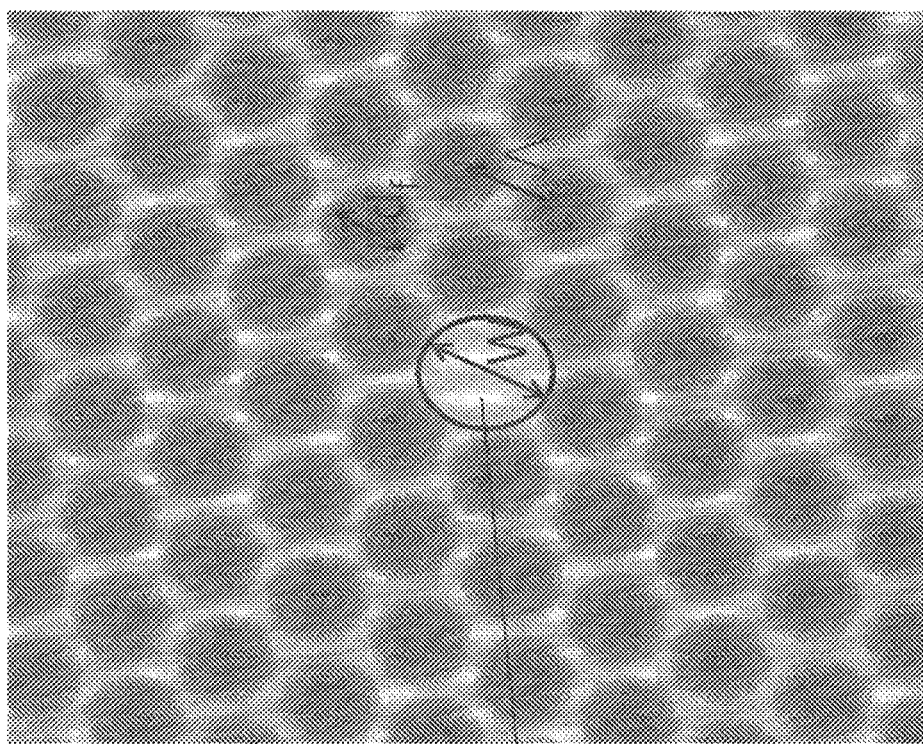
FIG. 3 shows part of a cross-section of a microstructured fiber, perpendicular to the longitudinal axis.

FIG. 3 shows part of a cross-section of a microstructured fiber, perpendicular to the longitudinal axis, corresponding to an enlargement of the square region denoted A in FIG. 2. In FIG. 3 is shown the core area or core region 2 as defined as the area of a circle inscribed by the microstructure elements of the cladding arranged to immediately surround the core 2. The circle has characteristic core diameter W being the diameter of the largest circle that may be inscribed within the core without interfering with any microstructure elements or cladding features of the fiber, in a cross-section through the fiber perpendicularly to the longitudinal axis thereof. The cladding comprises a microstructure with a plurality of microstructure elements or cladding features each having a microstructure element diameter $d_f$, and the microstructure elements are arranged at a pitch $\wedge$, where the pitch $\wedge$ is a measure of the spacing between the microstructure elements. As shown in FIG. 3 the pitch $\wedge$ is indicated as the distance between the centers of two adjacent microstructure elements.

Figure 4:
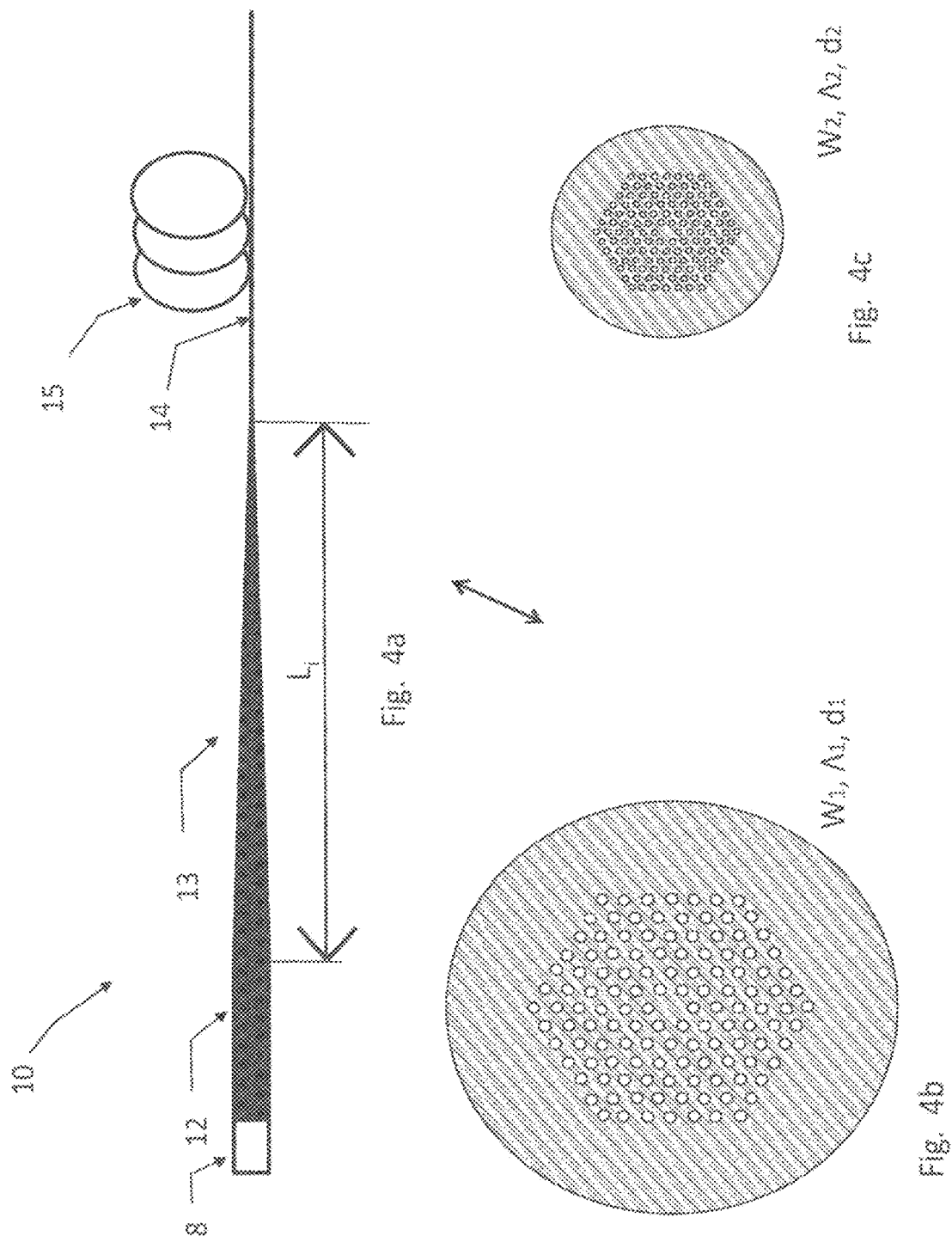
FIG. 4a shows a schematic drawing of a microstructured optical fiber according to the invention.
FIGS. 4b and 4c show cross-sections of a microstructured optical fiber, perpendicular to the longitudinal axis, at a first and second fiber length section, respectively.

FIG. 4a shows a schematic drawing of a microstructured optical fiber 10 according to the invention, and FIGS. 4b and 4c show cross-sections of the microstructured fiber, perpendicular to the longitudinal axis, at a first and second fiber length section, respectively. The microstructured optical fiber is arranged for generating supercontinuum light upon feeding of light having a first wavelength $\lambda_1$ preferably up to about 1100 nm, such as from about 900 nm to about 1100 nm. The optical fiber 10 has a length and a longitudinal axis along its length and comprises a core region for guiding light along the length of the optical fiber, and a first cladding region surrounding the core region.

The optical fiber 10, along its length, comprises a first fiber length section 12, a second fiber length section 14 as well as an intermediate fiber length section 13 between the first and second fiber length sections 12, 14.

In one embodiment the total length of the optical fiber 10 is such as less than about 50 m, such as less than about 30 m, such as less than about 20 m.

FIG. 4b shows a cross-section of the microstructured fiber, perpendicular to the longitudinal axis, at the first length section 12. It is indicated that the first fiber length section 12 has a core region with a first characteristic core diameter $W_1$ in a cross-section through the microstructured optical fiber perpendicularly to the longitudinal axis. The first characteristic core diameter $W_1$ is larger than about 7 µm. The second fiber length section 14 has a core region with a second characteristic core diameter $W_2$ in a cross-section through the microstructured optical fiber perpendicularly to the longitudinal axis, where the second characteristic core diameter $W_2$ is smaller than the first characteristic core diameter $W_1$. The microstructure elements of the microstructured optical fiber at the first fiber length section 12 are arranged at a pitch $\wedge_1$ and have a microstructure element diameter $d_1$, whilst the microstructure elements of the microstructured optical fiber at the second fiber length section 14 are arranged at a pitch $\wedge_2$ and have a microstructure element diameter $d_2$, as indicated in FIGS. 4b and 4c.

The intermediate fiber length section 13 of the optical fiber 10 comprises a core region which is tapered from the first characteristic core diameter $W_1$ to the second characteristic core diameter $W_2$ over a tapered length $L_{ti}$.

The first fiber length section 12 has normal dispersion at the first wavelength $\lambda_1$ and the second fiber length section has zero dispersion at a second wavelength $ZDW_2$, where $ZDW_2$ is up to about $\lambda_1 + 50$ nm. The second fiber length section has anomalous dispersion at wavelengths above the second wavelength $ZDW_2$.

Figure 5:
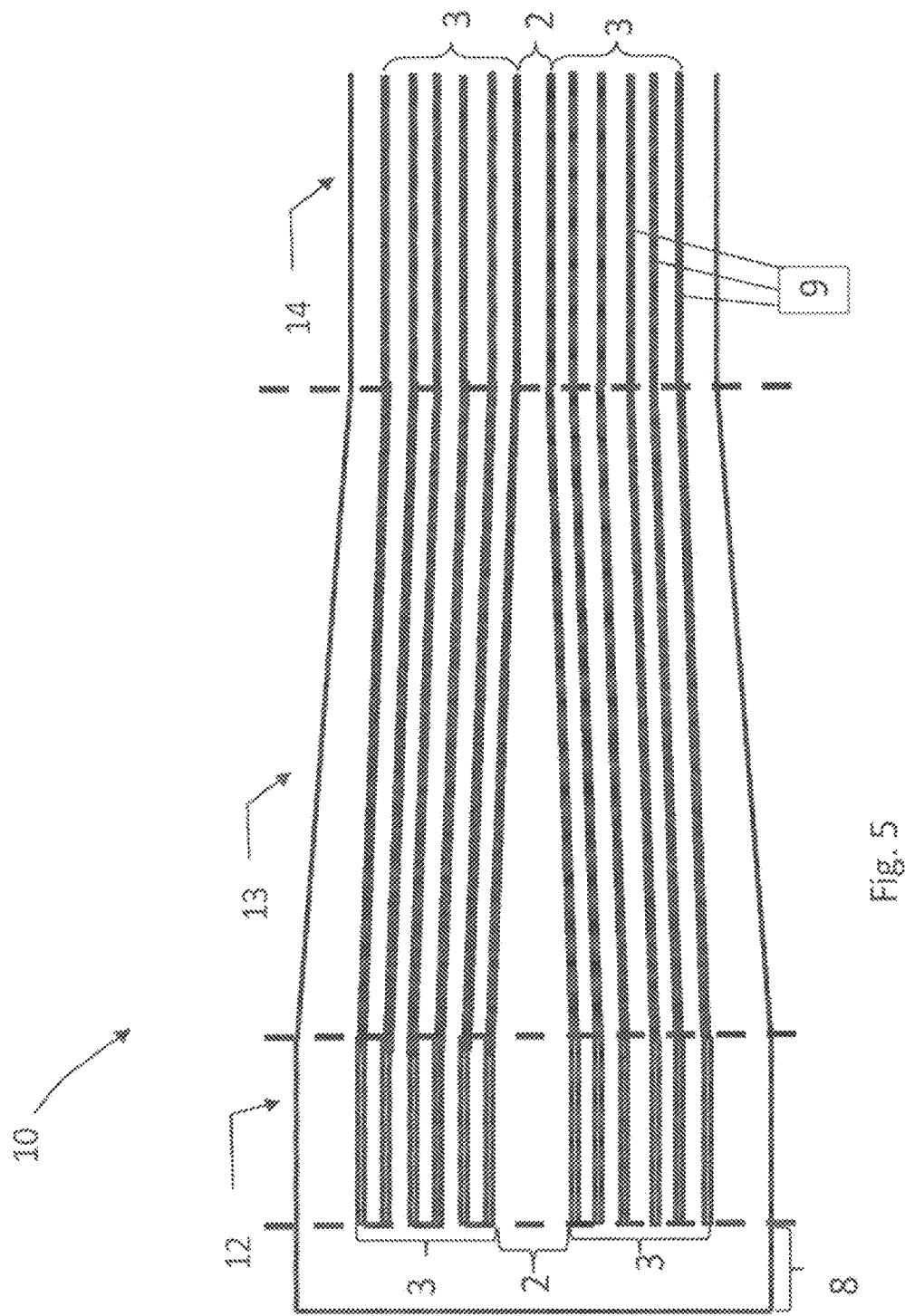
FIG. 5 is a cross-section of a microstructured optical fiber according to the invention, along the longitudinal axis.

FIG. 5 shows a cross-section of the tapered microstructured optical fiber 10 along the longitudinal axis. From FIG. 5 it may be seen that the structure of the microstructured optical fiber 10 comprising a core region 2 and a cladding region 3 is maintained throughout the first fiber length section 12, the tapering in the intermediate fiber length section 13 and the second fiber length section 14. As explained in relation to FIGS. 4a-4c, the size of the core region as well as the pitch and the microstructure diameter differ in the different fiber length sections 12, 13, 14 of the microstructured optical fiber, but the number of microstructures is kept, except at the end cap region 8 of the microstructured optical fiber 10. The vertical hatched lines in FIG. 6 indicates the transition between the first fiber length section 12 and the intermediate fiber length section 13 and between the second fiber length section 14 and the intermediate fiber length section 13.

Referring again to FIGS. 4a-4c, it may be seen from FIG. 5a that the tapering from the first fiber length section to the second fiber length section means a substantially monotonic decrease of the dimensions of the microstructured optical fiber from the first length section 12 to the second fiber length section 14. In the first fiber length section 12, the first characteristic core diameter $W_1$ is substantially constant, and in the second fiber length section 14, the second characteristic core diameter $W_2$ is substantially constant. Moreover, the microstructure element pitch $\wedge_1$ and microstructure element diameter $d_1$ are substantially constant in the first fiber length section 12; the microstructure element pitch $\wedge_2$ and microstructure element diameter $d_2$ are substantially constant in the second fiber length section 14, whilst the microstructure pitch and microstructure element diameter differ along at least a part of the intermediate fiber length section 13 of the microstructured optical fiber 10.

FIG. 5 shows a cross-section through a microstructured tapered fiber 10 according to an embodiment of the invention, along the longitudinal axis of the microstructured optical fiber. The microstructured optical fiber comprises an end cap 8, a first fiber length section 12, an intermediate fiber length section 13 and a second fiber length section 14. The vertical dashed lines indicate the transition between the end cap 8 and the first fiber length section, between the first fiber length section 12 and the intermediate fiber length section 13 and the transition between the intermediate fiber length section 13 and the second fiber length section 14, respectively.

FIG. 5 shows that the microstructured optical fiber 10 has a core region 2 and a cladding region 3. The cladding region comprises low-index cladding features 9, for example features in the form of holes or voids extending in the longitudinal direction of the microstructured optical fiber, and an inner cladding background or base material in which the cladding features are embedded. FIG. 5 shows that the core region 2 and thus the characteristic core diameter is larger in the first fiber length section 12 than in the second fiber length section 14, whilst the characteristic core diameter changes along the length of the intermediate fiber length section 13. Moreover, FIG. 5 shows that the number of low-index cladding features 9 is unchanged in the first fiber length section 12, the intermediate fiber length section 13 and the second fiber length section 14. However, the cladding region 3 is larger in the first fiber length section 12 than in the second fiber length section 14, whilst the size of the cladding region changes along the length of the intermediate length section 13.

As an example only, the characteristic core diameter at the first fiber length section is 10 µm and the characteristic core diameter at the second fiber length section is 5 µm.

It is an insight of the inventors that fiber damage due to high optical peak powers and/or pulse energies often takes place at the transition between the end cap and the first fiber length section 12, and not at the end cap input of the microstructured optical fiber. Therefore, by providing a fiber with enlarged input dimensions in the form of a fiber with a first fiber length section having enlarged core diameter compared to the second fiber length section, it is achieved that the microstructured optical fiber is able to receive more peak power and/or pulse energy without being damaged. It is believed that this is due to the effect that the light fed into the first fiber length section is distributed over the large core in the first fiber length section.

Figure 6:
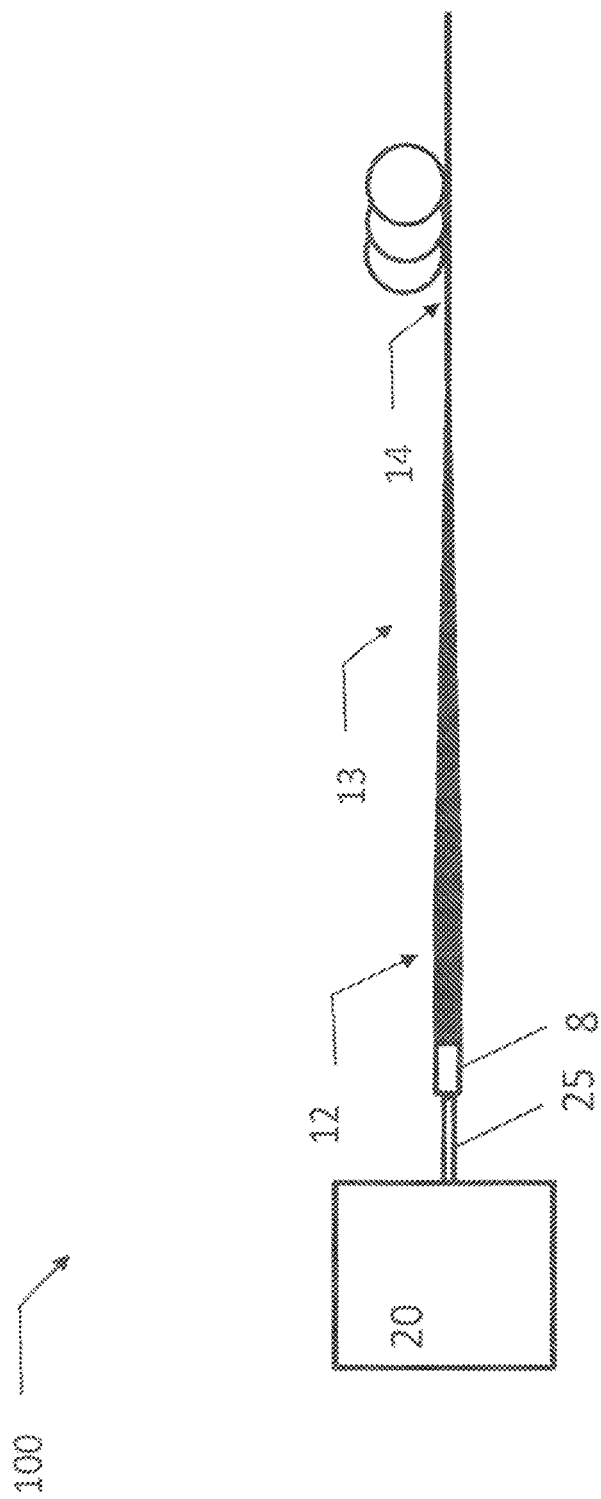
FIG. 6 is a schematic drawing of a supercontinuum light source comprising a microstructured optical fiber and a pump light source.

FIG. 6 is a schematic drawing of a supercontinuum light source 100 comprising a microstructured optical fiber 10 and a pump light source 20. The pump light source 20 has an output 25 arranged to feed light into the end cap 8 of the microstructured optical fiber 10, adjacent to the first fiber length section 12 of the optical fiber. The light fed into the end cap 8 of the optical fiber 10 continues to the intermediate fiber length section 13 and the second fiber length section 14. Due to the large size of the core of the microstructured optical fiber in the first fiber length section 12, a large amount of light may be fed into the microstructured optical fiber 10 without damaging it. The light is confined to the core region, and as the core region of the microstructured optical fiber is reduced throughout the intermediate fiber length section, the intensity of the confined light increases. However, due to the relatively long intermediate fiber length section 13, the transition of the light intensity from the first fiber length section 12 to the second fiber length section 14 takes place adiabatically.

Figure 7:
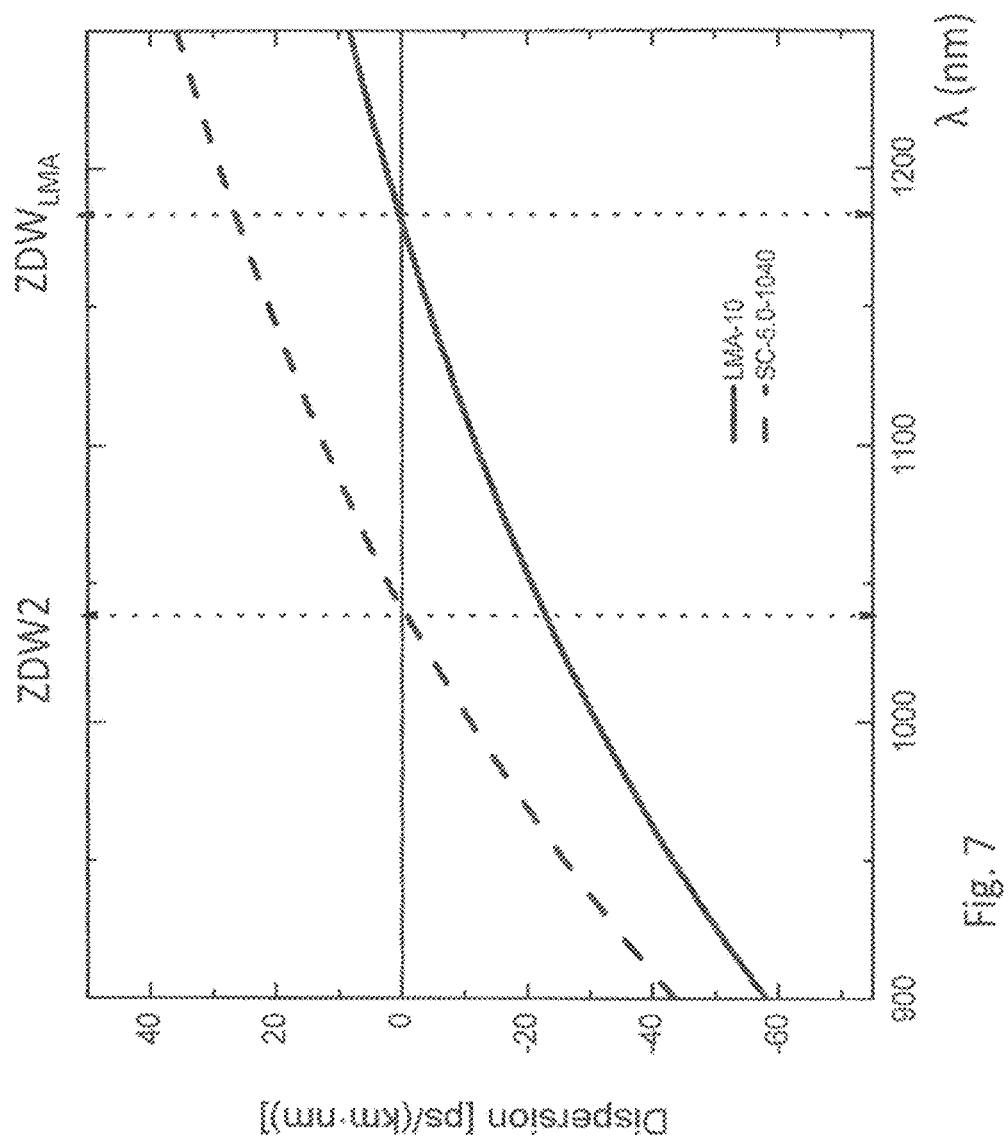
FIG. 7 is a graph showing dispersion curves for two optical fibers as a function of wavelength.
Figure 8:
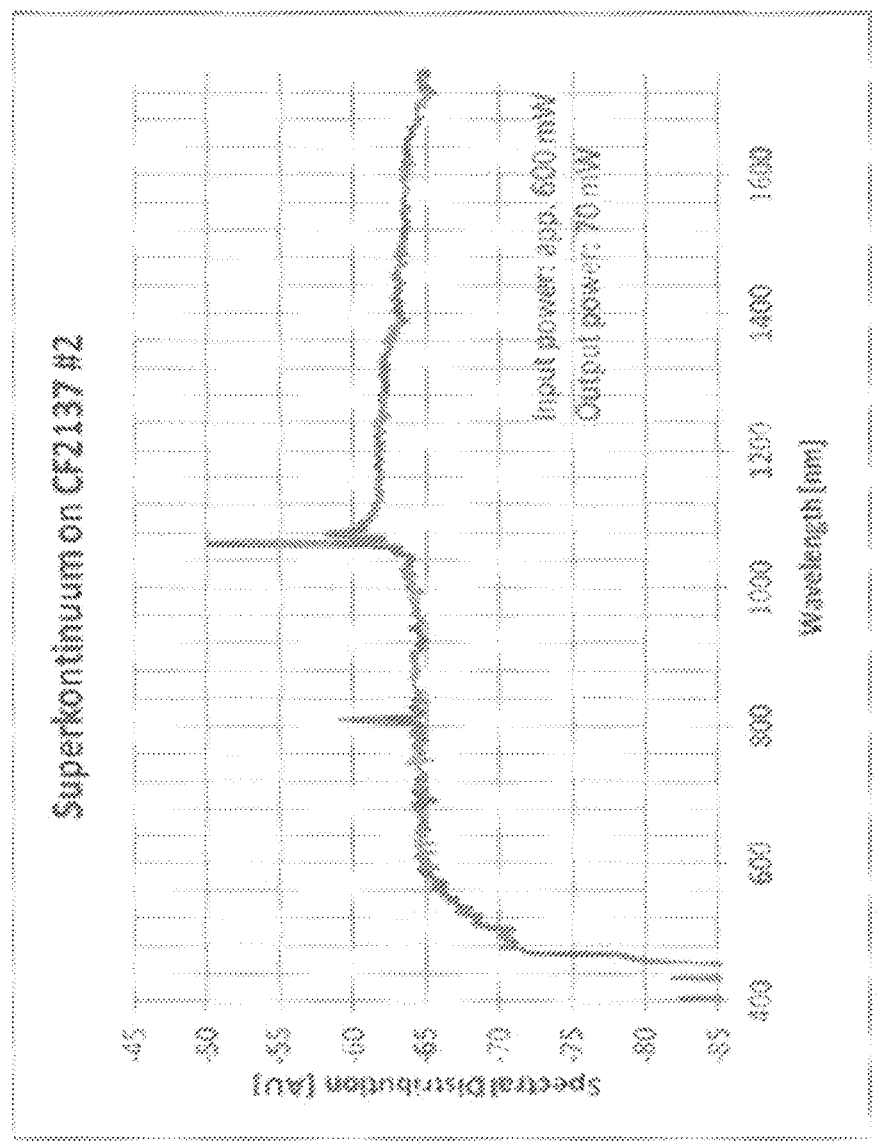
FIG. 8 is a supercontinuum spectrum from a supercontinuum light source of the invention.

FIG. 7 is a graph showing dispersion curves for two optical commercially available fibers, LMA-10 and SC-5.0-1040 (NKT Photonics A/S), as a function of wavelength λ. The dispersion curve for the optical fiber LMA-10 is shown by a solid curve, whilst the dispersion curve for the optical fiber SC-5.0-1040 is shown by a dashed curve. FIG. 8 shows that the zero dispersion wavelength, $ZDW_{LMA}$, for the optical fiber LMA-10 is about 1180 nm, whilst the zero dispersion wavelength, $ZDW_{SC}$, for the optical fiber SC-5.0-1040 is about 1040 nm. As the skilled person knows, the area below the horizontal line indicating zero dispersion corresponds to normal dispersion, whilst the area above the horizontal line indicating zero dispersion corresponds to anomalous dispersion. From this it can be seen that the first fiber length section in an embodiment of the microstructured fiber of the invention for example may have a cross-sectional structure corresponding to the optical fiber LMA-10, such that $ZDW_1=ZDW_{LMA}$, and the second fiber length section may have a cross-sectional structure corresponding to the optical fiber SC-5.0-1040, such that $ZDW_2=ZDW_{SC}$.

FIG. 8 is a supercontinuum spectrum from a supercontinuum light source 100 of the invention. The supercontinuum light source 100 comprises a pump light source 20 and a microstructured optical fiber for generating supercontinuum (SC) light (microstructured SC fiber 10).

The pump laser 20 applied was a passive q-switched laser, comprising a Nd:YAG crystal combined with a Cr:YAG. The backside of the Nd:YAG was coated with HR coating at 1064 nm and a semi-transparent mirror with a 60% reflection@1064 was placed in front of the Cr:YAG. The cavity was pumped using an 808 nm diode pump. The resulting laser cavity emitted pulsed light at 1064 nm with a repetition rate of app. 18-20 kHz and a pulse width of 1.2 ns. Measured output power was 600 mW, but with a portion of this light arising from non-absorbed pump laser light (residual 808 nm light).

The pump laser was attempted coupled into the commercially available fiber SC-5.0-1040 from NKT Photonics. The fiber has pitch $\Lambda$=3.3 µm, and relative hole size d/Λ=0.52 giving core size 5 µm. It was observed that the laser damaged the fiber in such a way that no light could be transmitted and that the damage seemed to occur instantaneously. This is a typical failure mechanism when the pulse energy is too high.

It is known from prior tests that the SC-5.0-1040 can withstand 1.2 ns laser pulses at 1064 nm having pulse peak power in the range of 10-12 kW, and that such pulses generate a broad supercontinuum from 0.5 to 2.4 µm in the fiber. This fiber is used for NKT Photonics commercial product SuperK Compact.

The pump laser 20 was applied to an example of the microstructured optical fiber of the invention comprising an intermediate tapered fiber length section in order to prove that this fiber could sustain the pulse peak power which a normal non-linear fiber cannot.

The microstructured optical fiber used for the experiment had the following characteristics:
d/Λ=0.52 in the first fiber length section, the second fiber length section as well as in the intermediate fiber length section;
Characteristic core diameter in first fiber length section: 10 µm;
Characteristic core diameter in second fiber length section: 5 µm;
Length of first fiber length section: app. 1 m (±0.1 m);
Length of taper, viz. intermediate fiber length section: app. 1 m (±0.1 m);
Total length of the microstructured optical fiber: app. 15 m (±0.5 m).

Both ends of the microstructured optical fiber were cleaved and collapsed with a 200 µm±25 µm collapse length, giving end caps.

The input end of the microstructured optical fiber viz. the input end of the first fiber length section, was positioned in front of the pump laser, and a pair of lenses was used to couple the light from the pump laser into the fiber. The lens pair consisted of a collimating lens having a 100 mm focal length and a focusing lens having a focal length of 3.5 mm. The two lenses were separated by a distance of app. 30 mm. The lenses were aligned in the x- and y-axis until seed light was coupled into the core of the microstructured optical fiber. Focus on the fiber was achieved by moving the microstructured optical fiber end towards the focusing lens until maximum power was measured using a thermal detector from Ophir Optronics (Ophir power head model#3A).

The alignment procedure continued until maximum power out of the microstructured optical fiber was measured. This was achieved around 70 mW output power.

Once a supercontinuum was achieved through the tapered microstructured optical fiber, the result was recorded using an Optical Spectrum Analyser (OSA) from ANDO, model #6315B. A spectrum was recorded from 400 to 1750 nm with a 5 nm resolution. The spectrum was recorded through an integrating sphere (Ocean Optics) with a multimode fiber having an Ø1 mm fiber core.

The coupling from the seed laser into the tapered microstructured optical fiber operated at maximum achieved output power (app. 70 mW) for app. 10 minutes in order to verify that the microstructured optical fiber core would not burn due to the increased pulse peak power. In contrast when the laser was fed directly into the prior art fiber SC-5.0-1040, the core of the optical fiber was destroyed within a few seconds once optimal power has been achieved due to the high peak power and pulse energy of the pump source. A significant portion of the measured 600 mW input power is believed to arise from non-absorbed 808 nm pump light which can be seen in the spectrum. To achieve the best injection efficiency into single-mode fiber, the direction, position, size and divergence of the beam from the pump light source are advantageously all optimized. In the present experiment, is believed that the lens pair was not optimally aligned with respect to the core of the microstructured optical fiber resulting in a significant portion of light being lost instead of reaching the microstructured optical fiber. Thus, it is believed that considerable more output power is achievable, in the order of magnitude 200-300 mW.

The experiment demonstrates that the first fiber length section having an enlarged size compared to the second fiber length section and compared to the standard non-linear fiber is capable of coupling the light into the second fiber length section which is here a single mode part of the microstructured optical fiber, thus creating a supercontinuum. Thus, light in the first fiber length section and/or in the intermediate fiber length section does not exit the microstructured optical fiber at end of these the respective first and intermediate fiber length sections, but is being coupled into the core of the single mode structure in the second fiber length section of the microstructured optical fiber.

The experiment also demonstrates that the expanded input in the form of the first fiber length section having a large first characteristic core diameter is able to sustain a greater pulse peak power than the prior art non-linear supercontinuum fibers. This is seen in that the relatively high peak power provided by the pump laser tends to damage the input end facet of a prior art standard supercontinuum, non-linear fiber but did not damage the tapered microstructured fiber of an embodiment of the invention.

Thus, the experiment shows that the microstructured optical fiber according to the invention is useful for relatively high energy pulse power compared to prior art fibers used for SC generation.

In an embodiment of the invention, the pump laser 200 is a q-switched laser comprising an active feedback to control the emission frequency (repetition rate) of the pump laser, and/or to reduce the timing jitter between the pump laser pulses.

Passive Q-switched pump lasers comprising an saturable absorber (e.g. a Cr:YAG Crystal) and a laser diode to pump the saturable absorber (e.g. a CW laser diode with a peak wavelength at 808 nm) are well known in the art. Here pulses are emitted from the pump laser whenever the saturable absorber becomes transparent (bleaches) thus changing the transmission through the crystal from a low transmission value to a high transmission value. This is e.g. described in the W. Koechner's book "Solid-State Laser Engineering" on pp. 522-523 (Springer, Sixth revised and Updated Edition, 2010, ISBN-13: 978-14419-2117-8). The repetition rate of the emitted pulse train is random in nature due to a number of limitations in the seed laser cavity (noise, fluctuation in input power, temperature fluctuation, etc.).

Figure 9:
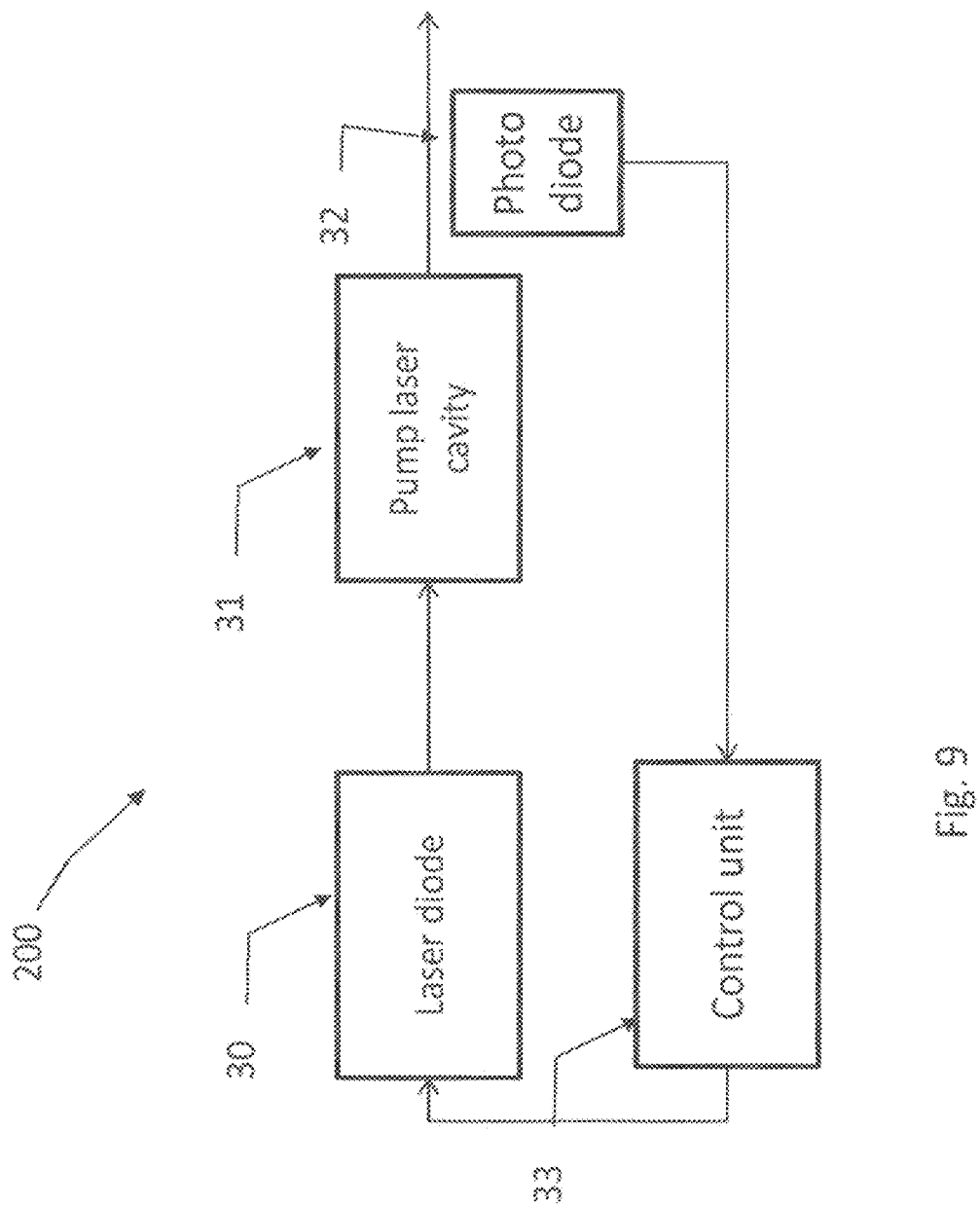
FIG. 9 is an illustration of a pump light source suitable for a super-continuum light source and comprising a system for active feedback.

In an aspect the inventors have found that a pump light source comprising a system for active feedback as shown in FIG. 9 in principle can be applied as pump source for any kind of supercontinuum fiber, such as non-tapered microstructured supercontinuum, in a supercontinuum light source. In an embodiment the pump light source comprises a q-switched laser comprising an active feedback system for active feedback as described below.

The pump light source generally provides a very stable emission frequency (repetition rate) of the pump laser and/or a reduced timing jitter between the pump laser pulses.

In an embodiment the control is obtained by modulating the output from the laser diode. This might e.g. be obtained by detecting whenever a pulse is emitted from the pump laser 200. The feedback signal is used to switch the laser diode from "ON" (emitting light) to "OFF" (no emission).

FIG. 9 is a diagram of an embodiment of the pump light source comprising a system for active feedback. As mentioned this pump light source may advantageously be used as a part of the supercontinuum light source of the invention but it may in principle be applied as a light source in any optical systems.

In the embodiment illustrated in FIG. 9, the pulse detection is obtained by placing a photodiode so that it receives part of the emitted pulses from the pump light source. The photodiode should be sensitive to light emitted from the pump laser (1064 nm), but not sensitive to light emitted from the laser diode (808 nm) as light from the laser diode may give rise to noise in the detection. This is obtained by either careful selection of photodiode type or by placing an appropriate filter in front of the detector.

When the laser diode 30 is turned "ON" it will start to pump energy into the pump laser cavity 31. No light is emitted from the pump laser until the saturation state of the saturable absorber is changed allowing light from the seed laser cavity to emit a pulse. When the pulse is emitted from the pump laser it will be detected by the photodiode 32. The signal from the photodiode is sent to a control unit 33, which sends a signal to the laser diode to shut it "OFF" thus preventing further light to be pumped into the laser cavity.

With the laser diode turned "OFF" no light is pumped into the pump laser cavity, and consequently no further seed laser pulses are emitted. The laser diode may be turned to "ON" again whenever a new pulse is requested by the supercontinuum laser system. This request may either be at a constant frequency or by a user trigger input. The maximum obtainable repetition rate is achieved when the requested frequency exceeds the pump capacity of the pump source laser. This happens when a new pulse is requested before the previous pulse is yet emitted from the pump laser. The laser diode will then operate continuously providing the maximal repetition rate possible by the pump laser.

During the laser diode "OFF" state the laser may be kept on a threshold level where no light is emitted from the laser. Keeping the laser diode at threshold will enable a faster rise time of the laser diode unit and thus a faster response of the pump laser.

The use of active feedback enables full control of the pump laser repetition rate up to the level where the laser diodes operates continuously, which typically occurs at a pump laser repetition rate of 40-50 kHz. Furthermore a much more stable pulse-to-pulse signal will be obtained as the pulse-to-pulse jitter is only dependent on the amount of energy (and thus time) the laser diode requires in order to provide sufficient energy for the pump laser to emit a pulse. The timing jitter between pulse emissions from the pump laser is reduced to a few hundred ns (100-300 ns) where a normal passive q-switched pump laser may have a pulse-to-pulse jitter in the range of a few ms (2-10 ms). As the pump laser only acquires the amount of energy sufficient in order to emit a single pulse at a time, the emitted pulse itself is expected to be less sensitive to pulse jitter such as pulse width jitter and pulse amplitude jitter.

In one embodiment of the invention the pump laser has a variable repletion rate.

In one embodiment of the invention the pump laser pulses are externally triggered. This could e.g. by used in connection with a measurement method having a finite sampling time, where it is advantageous to have the same number of pulses within each of the sampling intervals. One example is hyperspectral imaging with a given shutter time.

In one embodiment of the invention the pump laser timing jitter is such as less than about 1 ms, such as less than about 500 ns, such as less than about 300 ns, such as less than about 200 ns.

The supercontinuum light source of the invention has been found to be highly suitably for performing photoacoustic imaging due to its ability to generate supercontinuum pulses with very high pulse energy.

The invention also comprises a photoacoustic imaging system comprising a supercontinuum light source as described above, a detector for detecting ultrasonic emission waves and an image processor for forming an image of the detected ultrasonic waves. The detector can be any that is suitable for ultrasonic emission waves, preferably with a high sensitivity e.g. such as ultrasonic emission waves used in prior art photoacoustic imaging systems.

The processor for forming an image of the detected ultrasonic waves can for example be in prior art photoacoustic imaging system.

Photoacoustic imaging is well known and is based on the photoacoustic effect. In photoacoustic imaging, non-ionizing laser pulses are delivered into biological tissues. Some of the delivered energy will be absorbed and converted into heat, leading to transient thermoelastic expansion and thus wideband (e.g. MHz) ultrasonic emission. The generated ultrasonic waves are then detected by ultrasonic transducers to form images. It is known that optical absorption is closely associated with physiological properties, such as hemoglobin concentration and oxygen saturation. As a result, the magnitude of the ultrasonic emission (i.e. photoacoustic signal), which is proportional to the local energy deposition, reveals physiologically specific optical absorption contrast. 2D or 3D images of the targeted areas can then be formed.

The invention further comprises a method of performing photoacoustic imaging of a biological tissue the method comprising providing a photoacoustic imaging system as described above and delivering supercontinuum laser pulses from said supercontinuum light source to said biological tissue and collecting ultrasonic emission waves from said biological tissue by said detector and forming the image using said image processor.

Due to the very high power and pulse energy of the supercontinuum light source of the invention, the supercontinuum light source has further been found to be very suitable for use in multimodal imaging, e.g. combining photoacoustic and optical coherence tomography (OCT) imaging. The invention therefore also relates to a multimodal photoacoustic and optical coherence tomography (OCT) image acquisition system comprising photoacoustic imaging system as described above combined with an OCT imaging system, wherein the photoacoustic imaging system and the OCT imaging system using said supercontinuum light source as a common light source, said multimodal photoacoustic and optical coherence tomography (OCT) image acquisition system preferably further comprises a detector for collecting reflected light and an image processor for forming an image of the detected reflected light.

Optical coherence tomography is an established medical imaging technique. It is widely used, for example, to obtain high-resolution images of the anterior segment of the eye and the retina. OCT is advantageous for delivering high resolution because it is based on light, rather than sound or radio frequency.

An optical beam is directed at the tissue to be analyzed, and a small portion of this light that reflects from sub-surface features is collected. Most of the light is not reflected but, rather, scatters off at large angles. OCT uses a technique called interferometry to record the optical path length of received photons allowing rejection of most photons that scatter multiple times before detection. Thus OCT can build up clear 3D images of thick samples by rejecting background signal while collecting light directly reflected from surfaces of interest. The invention is in particular suited for spectral domain OCT.

The multimodal photoacoustic and optical coherence tomography (OCT) image acquisition system preferably comprises a filter for selecting a spectral portion of the light beams to be applied in the OCT. Due to the very high power the multimodal photoacoustic and optical coherence tomography (OCT) image acquisition system advantageously comprises an intensity filter for reducing the intensity applied in OCT in dependence on the subject to be analyzed. Where OCT is applied for analysis of sensitive tissue, such as eye tissue, it is desired that the intensity is kept relatively low in order not to damage the tissue.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the inventions including ranges and preferred ranges can be combined in various ways within the scope of the invention, unless there are specific reasons for not to combine such features.

Some embodiments have been shown in the foregoing, but it should be stressed that the invention is not limited to these, but may be embodied in other ways within the subject-matter defined in the following claims. Various modifications and applications may occur to those skilled in the art without departing from the true spirit and scope of the invention as defined in the appended claims.

The invention claimed is:

1. A microstructured optical fiber for generating supercontinuum light upon feeding of light having a first wavelength $\lambda_1$, the optical fiber having a length and a longitudinal axis along its length and comprising a core region for guiding light along the length of said optical fiber, and a first cladding region surrounding said core region, said first cladding region comprising a plurality of microstructure elements, wherein the plurality of microstructure elements are arranged in a plurality of layers within the first cladding region;

said optical fiber, along its length, comprises a first fiber length section, a second fiber length section, and an intermediate fiber length section between said first and second fiber length sections;

said first fiber length section has a core region with a first characteristic core diameter $W_1$ in a cross-section through the microstructured optical fiber perpendicularly to the longitudinal axis;

said second fiber length section has a core region with a second characteristic core diameter $W_2$ in a cross-section through the microstructured optical fiber perpendicularly to the longitudinal axis, where said second characteristic core diameter $W_2$ is smaller than said first characteristic core diameter $W_1$;

said intermediate length section of the optical fiber comprises a core region which is tapered from said first characteristic core diameter $W_1$ to said second characteristic core diameter $W_2$ over a tapered length $L_i$;

said first fiber length section has normal dispersion at said first wavelength $\lambda_i$ and a zero dispersion at a wavelength $ZDW_1$ where $ZDW_1 >$ about $\lambda_1 + 20$ nm; and said second fiber length section has zero dispersion at a second wavelength $ZDW_2$, where said second fiber length section has anomalous dispersion at wavelengths above said second wavelength $ZDW_2$.

2. The optical fiber according to claim 1, wherein said first wavelength $\lambda_1$ is up to about 1100 nm.

3. The optical fiber according to claim 1, wherein said first characteristic core diameter is larger than about 8 µm.

4. The optical fiber according to claim 1, wherein said second characteristic core diameter is larger than about 3 µm.

5. The optical fiber according to claim 1, wherein said inner cladding comprises a microstructure, said microstructure comprising a plurality of microstructure elements having a microstructure element diameter, $d_f$, said microstructure elements being arranged at a pitch $\wedge$, said pitch $\wedge$ being a measure of a spacing between the microstructure elements, wherein said microstructure is at least partially maintained along the first and second fiber length sections of the optical fiber, wherein the relative size $(d_f/\wedge)$ of the microstructure elements is larger in the second fiber length section of the optical fiber than in the first fiber length section of the optical fiber, said relative size being the ratio between the diameter $(d_f)$ of the microstructure elements and the pitch $\wedge$.

6. The optical fiber according to claim 5, wherein the relative size $(d_f/\wedge)$ of the microstructure elements is chosen so that the first fiber length section is a single mode fiber at least at the first wavelength $\lambda_1$.

7. The optical fiber according to claim 1, said optical fiber further comprising a second cladding surrounding said first cladding, wherein:
said core region is adapted to guide an optical signal at said first wavelength $\lambda_1$, said core region having an effective refractive index $n_{core}$, and where said core region comprises a material doped with at least one rare earth element;
said first cladding being arranged for guiding light at a third wavelength $\lambda_3$, said first cladding having an effective refractive index $n_{first-clad}$;
said second cladding having an effective refractive index $n_{second-clad}$; and $n_{core} > n_{first-clad} > n_{second-clad}$ and $\lambda_1 > \lambda_3$.

8. The optical fiber according to claim 1, wherein the first characteristic core diameter is larger than about 7 µm.

9. The optical fiber according to claim 1, wherein $ZDW_2$ is up to about $\lambda_1 + 50$ nm.

10. A supercontinuum light source comprising:
a microstructured optical fiber for generating supercontinuum light at a wavelength $\lambda_1$, said microstructured optical fiber comprising a core region that is capable of guiding light along a longitudinal axis of said optical fiber, and a first cladding region surrounding said core region, said first cladding region comprising a plurality of microstructure elements; and
a pump light source arranged to feed light into said core region at an input end of said optical fiber, said light having, a first wavelength, $\lambda_1$,
wherein:
the plurality of microstructure elements are arranged in a plurality of layers within the first cladding region;
said optical fiber has a length and a longitudinal axis along its length, wherein said optical fiber comprises a first fiber length section, a second fiber length section as well as an intermediate fiber length section between the first and second fiber length sections;
said first fiber length section has a core region with a first characteristic core diameter $W_1$;
said second fiber length section has a core region with a second characteristic core diameter $W_2$ in a cross-section through the microstructured optical fiber perpendicularly to the longitudinal axis, where said second characteristic core diameter W2 is smaller than said first characteristic core diameter $W_1$;
said intermediate fiber length section of the optical fiber comprises a core region which is tapered from said first characteristic core diameter $W_1$ to said second characteristic core diameter $W_2$ over a tapered length $L_i$;
said first fiber length section has normal dispersion at a first wavelength $\lambda_1$ and a zero dispersion at a wavelength $ZDW_1$ where $ZDW_1 >$ about $\lambda_1 + 20$ nm; and
said second fiber length section has zero dispersion at a second wavelength $ZDW_2$, where said second fiber length section has anomalous dispersion at wavelengths above said second wavelength $ZDW_2$.

11. The supercontinuum light source according to claim 10, wherein the pump light source has a pulse duration $\Delta t$, wherein the pulse duration is more than about 1 ps.

12. A supercontinuum light source according to claim 10, wherein an output pulse from said light source has a pulse length of less than about 20 ns.

13. A supercontinuum light source according to claim 10, said microstructured optical fiber further comprising a second cladding surrounding said first cladding, wherein:
said core region is adapted to guide an optical signal at said first wavelength $\lambda_1$, said core region having an effective refractive index $n_{core}$, and where said core region comprises a material doped with at least one rare earth element;
a second pump light source is arranged for feeding light at a second wavelength $\lambda_2$;
said first cladding being arranged for guiding light at said second wavelength $\lambda_2$, said first cladding having an effective refractive index $n_{first-clad}$;
said second cladding having an effective refractive index $n_{second-clad}$; and
$n_{core} > n_{first-clad} > n_{second-clad}$ and $\lambda_1 > \lambda_2$.

14. The supercontinuum light source according to claim 10, wherein the first characteristic core diameter is larger than about 7 µm.

15. The supercontinuum light source according to claim 10, wherein $ZDW_2$ is up to about $\lambda_1 + 50$ nm.

16. A method of using a supercontinuum light source according to claim 10, the method comprising delivering supercontinuum light from the supercontinuum light source and using the light delivered by the supercontinuum light source for at least one of the following applications: photoacoustic measurements, multi-spectral imaging, LIDAR (Light Detection and Ranging), STED (Stimulated Emission Depletion).

17. A photoacoustic imaging system comprising a supercontinuum light source according to claim 10, a detector for detecting ultrasonic emission waves, and an image processor for forming an image of the detected ultrasonic waves.

18. The photoacoustic imaging system of claim 17 further comprising an optical coherence tomography (OCT) imaging system, wherein the photoacoustic imaging system and the OCT imaging system use said supercontinuum light source as a common light source.

19. A method of performing photoacoustic imaging of a biological tissue the method comprising providing a photoacoustic imaging system as claimed in claim 17 and delivering supercontinuum laser pulses from said supercontinuum light source to said biological tissue and collecting ultrasonic emission waves from said biological tissue by said detector and forming the image using said image processor.

\* \* \* \* \*